US012690673B2

(12) United States Patent (10) Patent No.: US 12,690,673 B2
Guo (45) Date of Patent: Jul. 28, 2026

(54) CONNECTING ASSEMBLY OF STORAGE RACK AND STORAGE RACK

(71) Applicant: Xinxin Guo, Yiwu (CN)

(72) Inventor: Xinxin Guo, Yiwu (CN)

( * ) Notice: Subject to any disclaimer, the term of this patent is extended or adjusted under 35 U.S.C. 154(b) by 270 days.

(21) Appl. No.: 18/594,960

(22) Filed: Mar. 4, 2024

(65) Prior Publication Data

US 2025/0275630 A1 Sep. 4, 2025

(30) Foreign Application Priority Data

Mar. 1, 2024 (CN) .......................... 202420393576.8

(51) Int. Cl.
*F16B 12/42* (2006.01)
*A47B 57/54* (2006.01)
*F16B 9/00* (2006.01)

(52) U.S. Cl.
CPC .............. *A47B 57/54* (2013.01); *F16B 9/056* (2018.08); *F16B 12/42* (2013.01)

(58) Field of Classification Search
CPC ..... A47B 57/482; A47B 57/54; A47B 57/567; F16B 9/05; F16B 9/056; F16B 12/42
See application file for complete search history.

(56) References Cited

U.S. PATENT DOCUMENTS

| | | | | |
|---|---|---|---|---|
| 4,627,543 A | * | 12/1986 | Nicely .................. | A47B 57/265 |
| | | | | 211/208 |
| 6,253,933 B1 | * | 7/2001 | Yang ..................... | A47B 57/545 |
| | | | | 211/187 |
| 7,478,971 B2 | * | 1/2009 | Li .......................... | A47B 57/562 |
| | | | | 403/398 |
| 9,167,915 B1 | * | 10/2015 | Lau ....................... | A47B 57/545 |
| 12,188,506 B2 | * | 1/2025 | Woo .......................... | F16B 2/12 |

FOREIGN PATENT DOCUMENTS

| | | | | | |
|---|---|---|---|---|---|
| KR | 10-2010-0095870 A | * | 9/2010 | ............. | A47B 57/54 |
| KR | 20-2011-0004930 U | * | 5/2011 | ............. | A47B 96/06 |

\* cited by examiner

*Primary Examiner* — Michael P Ferguson

(57) ABSTRACT

A connecting assembly of a storage rack includes a connecting sleeve body sleeved on a supporting rod, a position limiting device arranged on the connecting sleeve body for preventing circumferential rotation of the storage tray around the supporting rod, and a locking device used for locking the connecting sleeve body onto the supporting rod. Through the above structure, the connecting sleeve body is sleeved on the supporting rod and locked onto the supporting rod via the locking device. At this time, the connecting sleeve body plays a role in supporting the storage tray. Users can adjust a locking position of the connecting sleeve body on the supporting rod according to actual situations, thereby facilitating an adjustment of up and down positions of the storage tray. The position limiting device on the connecting sleeve body can prevent the storage tray from shaking, thereby enhancing stability and safety of the storage rack.

15 Claims, 5 Drawing Sheets

CONNECTING ASSEMBLY OF STORAGE RACK AND STORAGE RACK

CROSS-REFERENCE TO RELATED APPLICATIONS

The application claims priority of Chinese patent application CN2024203935768, filed on Mar. 1, 2024, which is incorporated herein by reference in its entireties.

TECHNICAL FIELD

The present invention relates to a field of storage racks, in particular to a connecting assembly of a storage rack and a storage rack.

BACKGROUND ART

With the development of the times, the living conditions of the people are getting better and better, and the daily items in people's homes are becoming more and more diverse. Therefore, a simple, elegant and cleverly designed storage rack has become a necessity for people to organize these items at home. The storage rack not only effectively helps people categorize daily necessities, but also makes it easy to take and place items, saving the trouble of searching.

However, a traditional storage rack may have some problems, such as insufficient load-bearing capacity, difficult installation, and inconvenient adjustment, which can affect users' experience. Therefore, there is an urgent need to provide a storage rack with strong load-bearing capacity and easy adjustment on the market to improve the user experience.

SUMMARY

In order to overcome the shortcomings of existing technology, a connecting assembly of a storage rack and a storage rack are provided, which can be used by a user to classify and place daily necessities and have the characteristics of strong load-bearing capacity and easy adjustment.

A technical solution is adopted by the present invention to solve its technical problems.

A connecting assembly of a storage rack is provided by the present invention, including: a connecting sleeve body, the connecting sleeve body being used for sleeving a supporting rod; a position limiting device, the position limiting device being arranged on the connecting sleeve body, and the position limiting device being used for preventing a storage tray from rotating around the supporting rod in a circumferential direction; and a locking device, the locking device being used for locking the connecting sleeve body onto the supporting rod.

As an improvement of the present invention, the locking device includes a first connecting member and a second connecting member. The first connecting member is provided on the connecting sleeve body, and the first connecting member is connected to the second connecting member to lock the connecting sleeve body onto the supporting rod.

As an improvement of the present invention, the first connecting member and the second connecting member are detachably connected.

As an improvement of the present invention, the connecting sleeve body is a U-shaped hollow sleeve body. The connecting sleeve body is provided with a first side end, a second side end, and a first side opening. The first connecting member includes a first clamping arm and a second clamping arm. The first clamping arm is connected to the first side end. The second clamping arm is connected to the second side end. The second connecting member includes a fixing cap. The fixing cap is connected to the first clamping arm and the second clamping arm to cause the connecting sleeve body to converge radially inward and abut against the supporting rod.

As an improvement of the present invention, an outer surface of the first clamping arm and an outer surface of the second clamping arm are both equipped with an external threaded structure, and the fixing cap is equipped with an internal threaded structure. The fixing cap engages with the first clamping arm and the second clamping arm through threads. When the fixing cap is twisted into the first clamping arm and the second clamping arm, the first clamping arm and the second clamping arm drive the connecting sleeve body to converge radially inward and abut against the supporting rod.

As an improvement of the present invention, the first clamping arm and the second clamping arm are arc-shaped.

As an improvement of the present invention, the position limiting device includes an engaging member fixedly connected to an upper end surface of the connecting sleeve body. The engaging member is used for engaging with an engaging slot of the storage tray to limit circumferential rotation of the storage tray around the supporting rod.

As an improvement of the present invention, the engaging member is an approximately semicircular arc-shaped sheet, and a thickness of the engaging member is less than a thickness of the connecting sleeve body. When the engaging member engages with the engaging slot, a bottom surface of the storage tray abuts against the upper end surface of the connecting sleeve body.

As an improvement of the present invention, an inner wall of the connecting sleeve body is fixedly connected with a first tightening rod and a second tightening rod. The first tightening rod and the second tightening rod are respectively arranged on two opposite side walls of the connecting sleeve body. The first tightening rod extends to an inner wall of the first clamping arm, and the second tightening rod extends to an inner wall of the second clamping arm.

As an improvement of the present invention, an outer surface of the fixing cap is equipped with a plurality of anti-slip convex strips.

A storage rack is further provided by the present invention, including a supporting rod, a storage tray, and a connecting assembly. The connecting assembly includes: a connecting sleeve body, the connecting sleeve body being used for sleeving the supporting rod; a position limiting device, the position limiting device being arranged on the connecting sleeve body, and the position limiting device being used for preventing the storage tray from rotating around the supporting rod in a circumferential direction; and a locking device, the locking device being used for locking the connecting sleeve body onto the supporting rod.

As an improvement of the present invention, the locking device includes a first connecting member and a second connecting member. The first connecting member is provided on the connecting sleeve body, and the first connecting member is connected to the second connecting member to lock the connecting sleeve body onto the supporting rod.

As an improvement of the present invention, the first connecting member and the second connecting member are detachably connected.

As an improvement of the present invention, the connecting sleeve body is a U-shaped hollow sleeve body. The connecting sleeve body is provided with a first side end, a second side end, and a first side opening. The first connecting member includes a first clamping arm and a second clamping arm. The first clamping arm is connected to the first side end. The second clamping arm is connected to the second side end. The second connecting member includes a fixing cap. The fixing cap is connected to the first clamping arm and the second clamping arm to cause the connecting sleeve body to converge radially inward and abut against the supporting rod.

As an improvement of the present invention, an outer surface of the first clamping arm and an outer surface of the second clamping arm are both equipped with an external threaded structure, and the fixing cap is equipped with an internal threaded structure. The fixing cap engages with the first clamping arm and the second clamping arm through threads. When the fixing cap is twisted into the first clamping arm and the second clamping arm relative to the connecting sleeve body, the first clamping arm and the second clamping arm drive the connecting sleeve body to converge radially inward and abut against the supporting rod.

As an improvement of the present invention, the first clamping arm and the second clamping arm are arc-shaped.

As an improvement of the present invention, the position limiting device includes an engaging member fixedly connected to an upper end surface of the connecting sleeve body. The storage tray is equipped with a through hole and an engaging slot. The through hole is in communication with the engaging slot. The storage tray is sleeved on the supporting rod through the through hole, and the engaging member engages with the engaging slot to limit circumferential rotation of the storage tray around the supporting rod.

As an improvement of the present invention, the engaging member is an approximately semicircular arc-shaped sheet, and a thickness of the engaging member is less than a thickness of the connecting sleeve body. When the engaging member engages with the engaging slot, a bottom surface of the storage tray abuts against the upper end surface of the connecting sleeve body.

As an improvement of the present invention, an inner wall of the connecting sleeve body is fixedly connected with a first tightening rod and a second tightening rod. The first tightening rod and the second tightening rod are respectively arranged on two opposite side walls of the connecting sleeve body. The first tightening rod extends to an inner wall of the first clamping arm, and the second tightening rod extends to an inner wall of the second clamping arm.

As an improvement of the present invention, an outer surface of the fixing cap is equipped with a plurality of anti-slip convex strips.

The connecting assembly of the storage rack is provided by the present invention, including the connecting sleeve body, the position limiting device, and the locking device. The connecting sleeve body is used for sleeving a supporting rod. The position limiting device is arranged on the connecting sleeve body, and the position limiting device is used for preventing the storage tray from rotating around the supporting rod in a circumferential direction. The locking device is used for locking the connecting sleeve body onto the supporting rod. Through the above structure, the connecting sleeve body is sleeved on the supporting rod and is locked and fixed on the supporting rod via the locking device. At this time, the connecting sleeve body plays a role in supporting the storage tray sleeved on the supporting rod. The user can appropriately adjust a locking position of the connecting sleeve body on the supporting rod according to an actual situation, so as to facilitate an adjustment of the up and down positions of the storage tray. Moreover, due to the position limiting device on the connecting sleeve body, the storage tray can be prevented from shaking left and right, thereby enhancing the stability and safety of the storage rack, greatly improving user experience.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
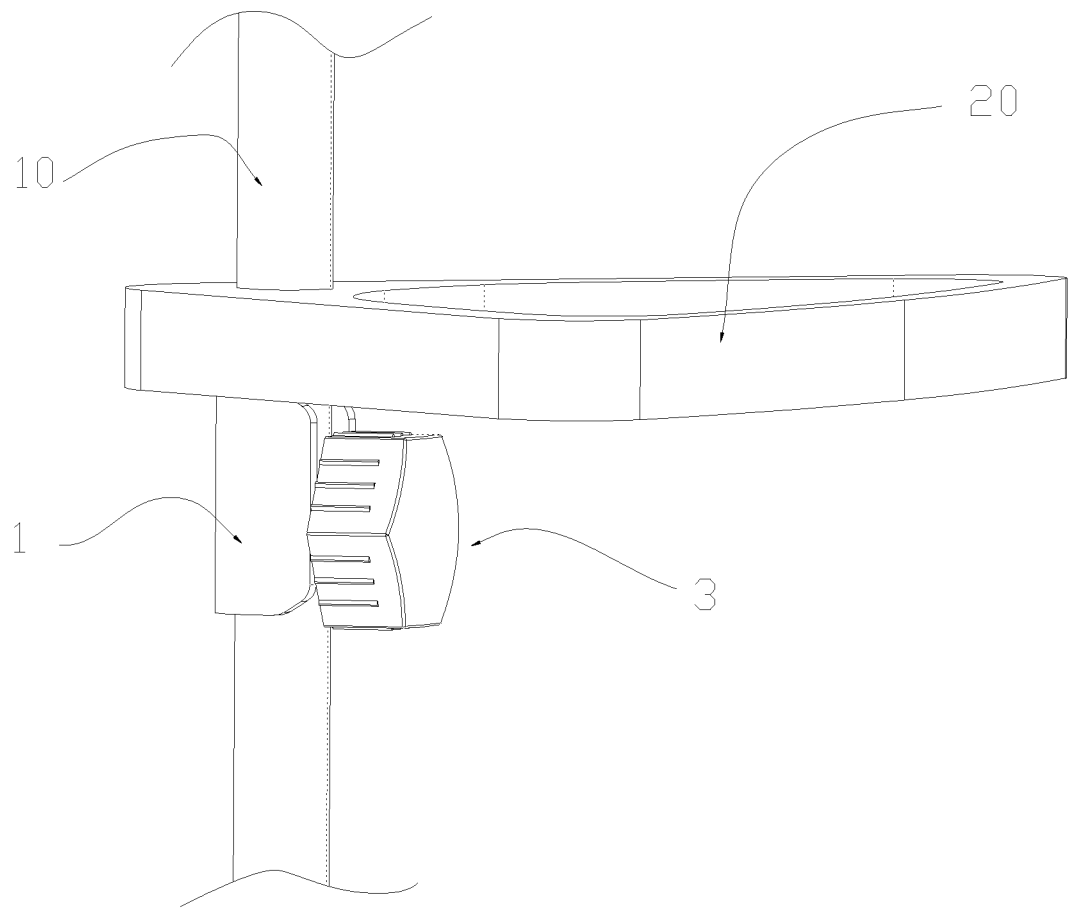
FIG. 1 is a schematic diagram of an overall structure according to the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
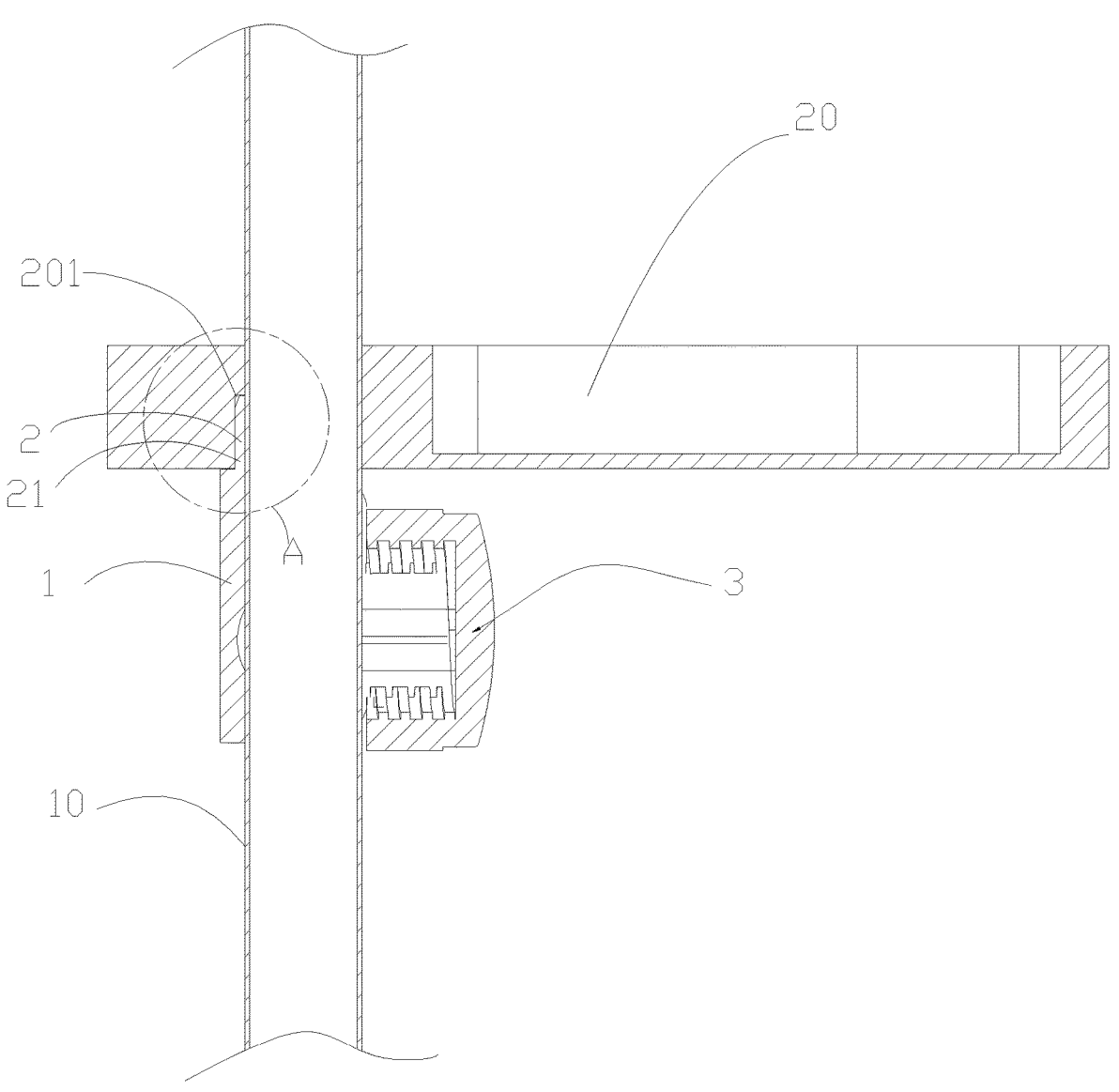
FIG. 2 is a sectional view according to the present invention.
Figure 3:
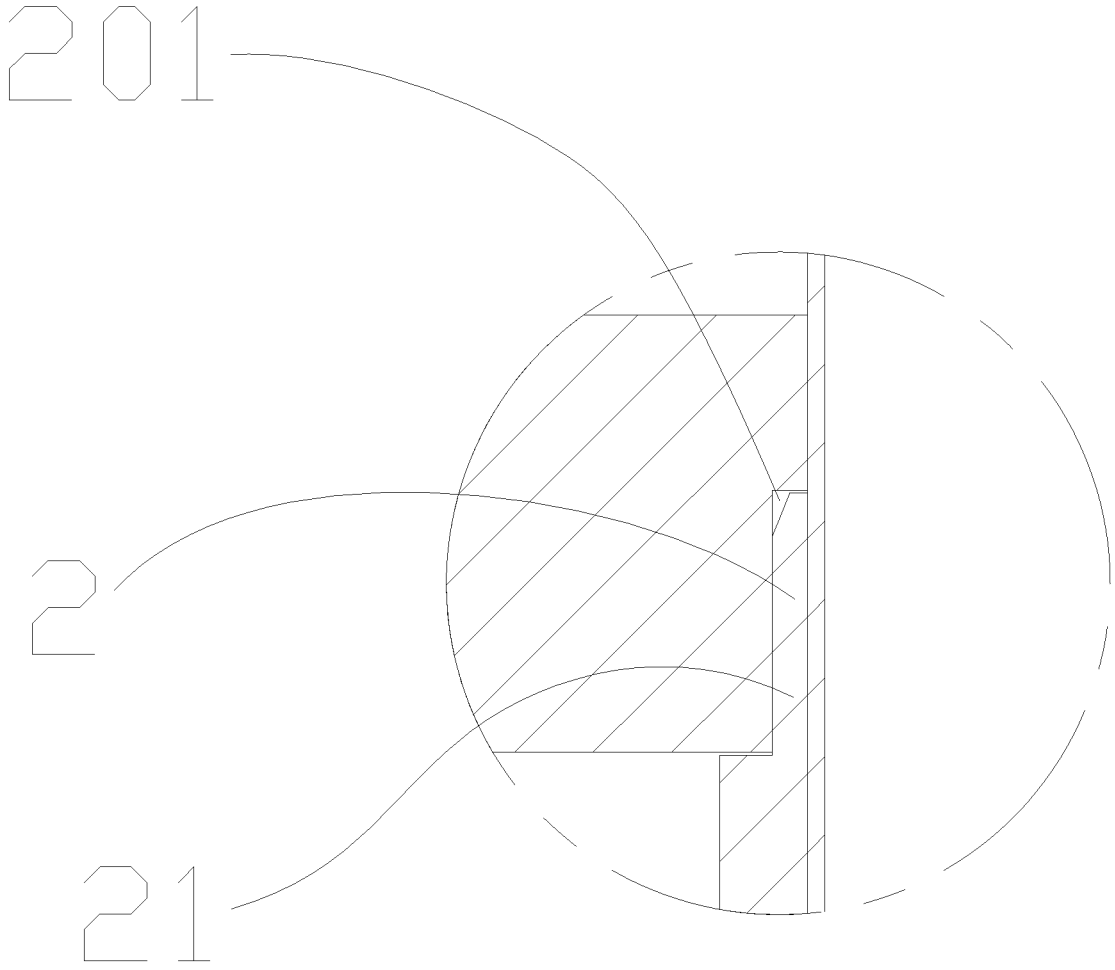
FIG. 3 is an enlarged view of area A in FIG. 2.
Figure 4:
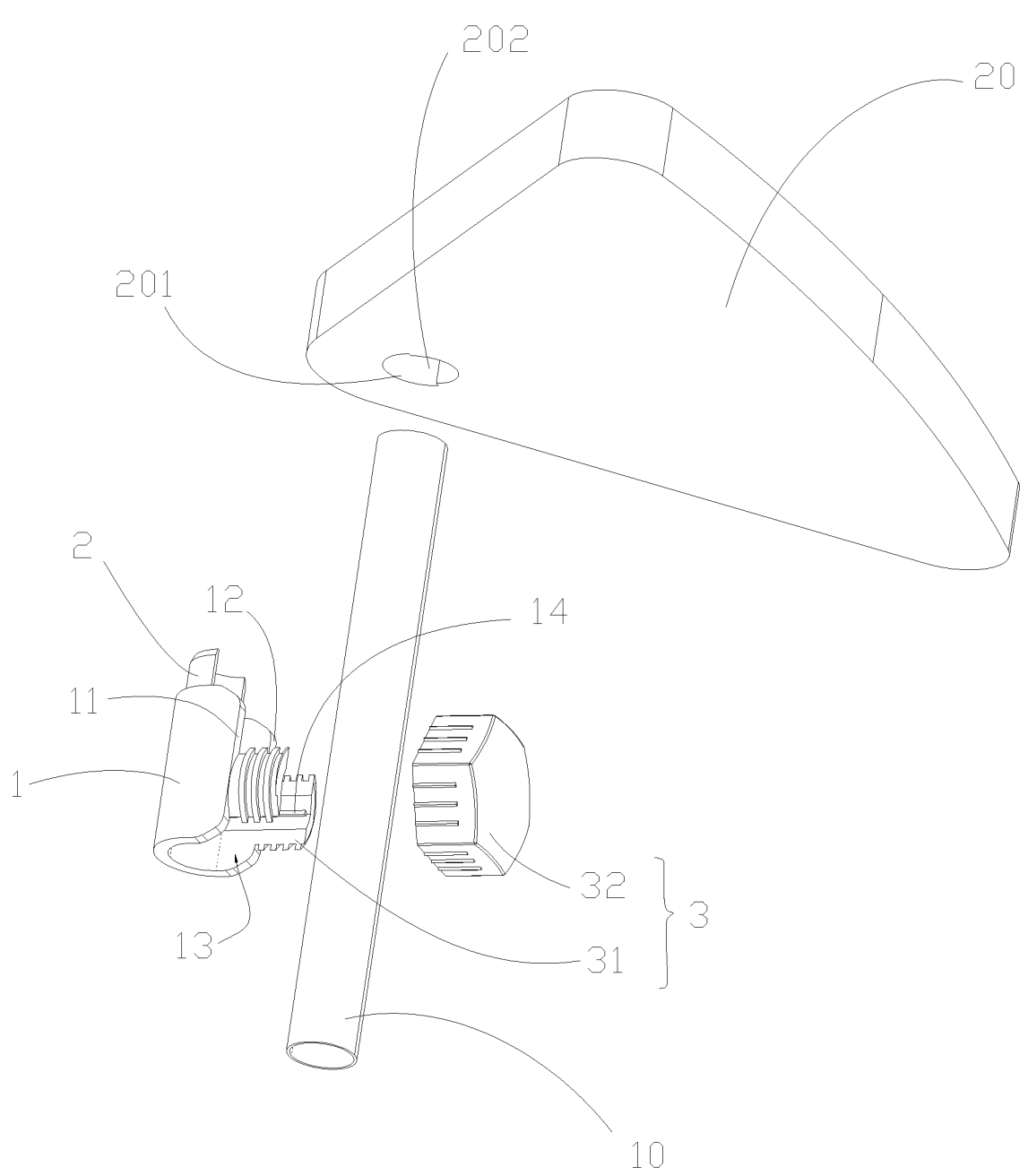
FIG. 4 is an exploded view according to the present invention.
Figure 5:
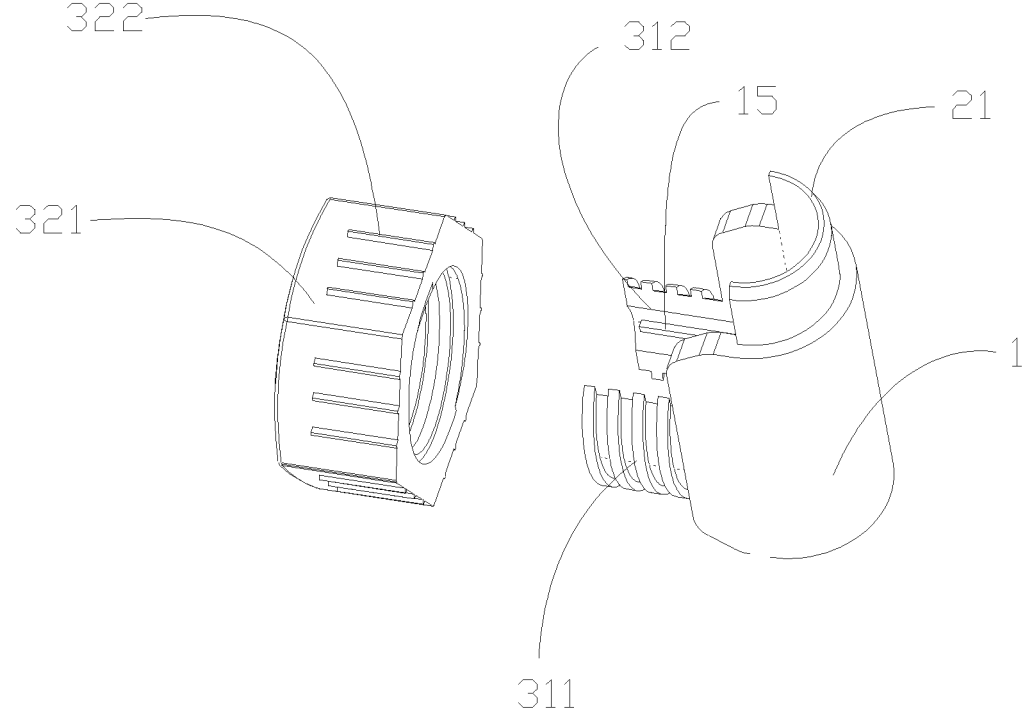
FIG. 5 is a schematic diagram of a locking device according to the present invention.

Referring to FIGS. 1 to 5, a connecting assembly of a storage rack includes a connecting sleeve body 1, a position limiting device 2 and a locking device 3. The connecting sleeve body 1 is used for sleeving a supporting rod 10. The position limiting device 2 is arranged on the connecting sleeve body 1, and the position limiting device 2 is used for preventing a storage tray 20 from rotating around the supporting rod 10 in a circumferential direction. The locking device 3 is used for locking the connecting sleeve body 1 onto the supporting rod 10. Through the above structure, the connecting sleeve body 1 is arranged on the supporting rod 10, and the connecting sleeve body 1 is locked and fixed on the supporting rod 10 via the locking device 3. At this time, the connecting sleeve body 1 plays a role in supporting the storage tray 20 sleeved on the supporting rod 10. A user can appropriately adjust a locking position of the connecting sleeve body 1 on the supporting rod 10 according to an actual situation, thereby achieving easy adjustment of up and down positions of the storage tray 20. Moreover, due to the position limiting device 2 on the connecting sleeve body 1, the storage tray 20 can be prevented from shaking left and right, thereby enhancing the stability and safety of the storage rack, greatly improving the user experience.

In this embodiment, the locking device 3 includes a first connecting member 31 and a second connecting member 32. The first connecting member 31 is provided on the connecting sleeve body 1, and the first connecting member 31 is connected to the second connecting member 32 to lock the connecting sleeve body 1 onto the supporting rod 10. Specifically, the first connecting member 31 and the second connecting member 32 are detachably connected.

Specifically, the connecting sleeve body 1 is a U-shaped hollow sleeve body. The connecting sleeve body 1 is provided with a first side end 11, a second side end 12, and a first side opening 13. The first connecting member 31 includes a first clamping arm 311 and a second clamping arm 312. The first clamping arm 311 is connected to the first side end 11. The second clamping arm 312 is connected to the second side end 12. The second connecting member 32 includes a fixing cap 321. The fixing cap 321 is connected to the first clamping arm 311 and the second clamping arm 312 to cause the connecting sleeve body 1 to converge radially inward and abut against the supporting rod 10. Through the above structure, when the storage rack is used, the user can squeeze the supporting rod 10 into the connecting sleeve body 1 through the first side opening 13, and then sleeve the fixing cap 321 on outer walls of the first clamping arm 311 and the second clamping arm 312. When the fixing cap 321 is squeezed inward along the clamping arms towards the connecting sleeve body 1, the first side end 11 and the second side end 12 of the connecting sleeve body 1 are close to each other under an action of characteristics of rubber and plastic, generating an inward squeezing force, so as to lock the connecting sleeve body 1 onto the supporting rod 10, thereby achieving a function of supporting and abutting against the storage tray 20, enhancing a support and bearing capacity of the storage rack. Moreover, since the first connecting member 31 and the second connecting member 32 are detachably connected, it is convenient for the user to adjust a position of the connecting sleeve body 1 on the supporting rod 10 at any time, adjust a distance between the storage trays 20, and enable the user to adjust according to a height or aesthetics of the placed items, thereby significantly improving user experience.

Furthermore, an outer surface of the first clamping arm 311 and an outer surface of the second clamping arm 312 are both equipped with an external threaded structure, and the fixing cap 321 is equipped with an internal threaded structure. The fixing cap 321 engages with the first clamping arm 311 and the second clamping arm 312 through threads. When the fixing cap 321 is twisted into the first clamping arm 311 and the second clamping arm 312, the first clamping arm 311 and the second clamping arm 312 drive the connecting sleeve body 1 to converge radially inward and abut against the supporting rod 10. Preferably, the first clamping arm 311 and the second clamping arm 312 are arc-shaped. Through the above structure, the fixing cap 321 is adjusted with the first clamping arm 311 and the second clamping arm 312 through threads. As the fixing cap 321 rotates inward into the clamping arms, an inward squeezing force of the connecting sleeve body 1 increases, and then the connecting sleeve body 1 is firmly locked onto the supporting rod 10. The installation process is simple, making it convenient and fast to use.

In this embodiment, the position limiting device 2 includes an engaging member 21 fixedly connected to an upper end surface of the connecting sleeve body 1. The engaging member 21 is used for engaging with an engaging slot 201 of the storage tray 20 to limit circumferential rotation of the storage tray 20 around the supporting rod 10. Preferably, the engaging member 21 is an approximately semicircular arc-shaped sheet, and a thickness of the engaging member 21 is less than a thickness of the connecting sleeve body 1. When the engaging member 21 engages with the engaging slot 201, a bottom surface of the storage tray 20 abuts against the upper end surface of the connecting sleeve body 1. Through the above structure, after the connecting sleeve body 1 is locked and fixed on the supporting rod 10, the storage tray 20 can be sleeved on the supporting rod 10, and after a direction of the engaging slot 201 is aligned with the engaging member 21, the engaging member 21 is capable of engaging with the engaging slot 201. A size of the engaging slot 201 basically matches a size of the engaging member 21, so that the storage tray 20 cannot rotate left and right under the restriction of the engaging member 21, thereby strengthening the stability of the storage tray. The design has a simple structure and convenient installation, and the user's needs and convenience are taken into account, thereby improving use experience.

In this embodiment, an inner wall of the connecting sleeve body 1 is fixedly connected with a first tightening rod 14 and a second tightening rod 15. The first tightening rod 14 and the second tightening rod 15 are respectively arranged on two opposite side walls of the connecting sleeve body 1. The first tightening rod 14 extends to an inner wall of the first clamping arm 311, and the second tightening rod 15 extends to an inner wall of the second clamping arm 312. Through the above structure, when the connecting sleeve body 1 is locked and fixed to the supporting rod 10, since a diameter of the supporting rod 10 is smaller than a inner diameter of the connecting sleeve body 1, the first tightening rod 14 and the second tightening rod 15 play a tightening role, making the connecting sleeve body 1 more firmly locked to the supporting rod 10, thereby enhancing a support force of the storage rack and improving stability.

In this embodiment, an outer surface of the fixing cap 321 is equipped with a plurality of anti-slip convex strips 322. Through the above structure, grip strength of the fixing cap 321 is improved, making it more convenient for the user to install or disassemble, and increasing safety and stability during use.

Referring to FIGS. 1 to 5, a storage rack includes a supporting rod 10, a storage tray 20, and a connecting assembly. The connecting assembly includes a connecting sleeve body 1, a position limiting device 2 and a locking device 3. The connecting sleeve body 1 is used for sleeving the supporting rod 10. The position limiting device 2 is arranged on the connecting sleeve body 1, and the position limiting device 2 is used for preventing the storage tray 20 from rotating around the supporting rod 10 in a circumferential direction. The locking device 3 is used for locking the connecting sleeve body 1 onto the supporting rod 10. Through the above structure, the connecting sleeve body 1 is sleeved on the supporting rod 10, and the connecting sleeve body 1 is locked and fixed on the supporting rod 10 via the locking device 3. At this time, the connecting sleeve body 1 plays a role in supporting the storage tray 20 sleeved on the supporting rod 10. A user can appropriately adjust a locking position of the connecting sleeve body 1 on the supporting rod 10 according to an actual situation, so as to facilitate an adjustment of up and down positions of the storage tray 20. Moreover, due to the position limiting device 2 on the connecting sleeve body 1, the storage tray 20 can be prevented from shaking left and right, thereby enhancing the stability and safety of the storage rack, and greatly improving user experience.

In this embodiment, the locking device 3 includes a first connecting member 31 and a second connecting member 32. The first connecting member 31 is provided on the connecting sleeve body 1, and the first connecting member 31 is connected to the second connecting member 32 to lock the connecting sleeve body 1 onto the supporting rod 10. Specifically, the first connecting member 31 and the second connecting member 32 are detachably connected.

Specifically, the connecting sleeve body 1 is a U-shaped hollow sleeve body. The connecting sleeve body 1 is provided with a first side end 11, a second side end 12, and a first side opening 13. The first connecting member 31 includes a first clamping arm 311 and a second clamping arm 312. The first clamping arm 311 is connected to the first side end 11. The second clamping arm 312 is connected to the second side end 12. The second connecting member 32 includes a fixing cap 321. The fixing cap 321 is connected to the first clamping arm 311 and the second clamping arm 312 to cause the connecting sleeve body 1 to converge radially inward and abut against the supporting rod 10. Through the above structure, when the storage rack is used, the user can squeeze the supporting rod 10 into the connecting sleeve body 1 through the first side opening 13, and then place the fixing cap 321 on outer walls of the first clamping arm 311 and the second clamping arm 312. When the fixing cap 321 is squeezed inward along the clamping arms towards the connecting sleeve body 1, the first side end 11 and the second side end 12 of the connecting sleeve body 1 are close to each other under an action of characteristics of rubber and plastic, generating an inward squeezing force, so as to lock the connecting sleeve body 1 onto the supporting rod 10, thereby achieving a function of supporting and abutting against the storage tray 20, enhancing a support and bearing capacity of the storage rack. Moreover, since the first connecting member 31 and the second connecting member 32 are detachably connected, it is convenient for the user to adjust a position of the connecting sleeve body 1 on the supporting rod 10 at any time, adjust a distance between the storage trays 20, and enable the user to adjust according to a height or aesthetics of the placed items, thereby significantly improving user experience.

Furthermore, an outer surface of the first clamping arm 311 and an outer surface of the second clamping arm 312 are both equipped with an external threaded structure, and the fixing cap 321 is equipped with an internal threaded structure. The fixing cap 321 engages with the first clamping arm 311 and the second clamping arm 312 through threads. When the fixing cap 321 is twisted into the first clamping arm 311 and the second clamping arm 312, the first clamping arm 311 and the second clamping arm 312 drive the connecting sleeve body 1 to converge radially inward and abut against the supporting rod 10. Preferably, the first clamping arm 311 and the second clamping arm 312 are arc-shaped. Through the above structure, the fixing cap 321 is adjusted with the first clamping arm 311 and the second clamping arm 312 through threads. As the fixing cap 321 rotates inward into the clamping arms, an inward squeezing force of the connecting sleeve body 1 increases, and then the connecting sleeve body 1 is firmly locked onto the supporting rod 10. The installation process is simple, making it convenient and fast to use.

In this embodiment, the position limiting device 2 includes an engaging member 21 fixedly connected to an upper end surface of the connecting sleeve body 1. The storage tray 20 is equipped with a through hole 202 and an engaging slot 201. The through hole 202 is in communication with the engaging slot 201. The storage tray 20 is sleeved on the supporting rod 10 through the through hole 202, and the engaging member engages with the engaging slot 201 to limit circumferential rotation of the storage tray 20 around the supporting rod 10. Preferably, the engaging member 21 is an approximately semicircular arc-shaped sheet, and a thickness of the engaging member 21 is less than a thickness of the connecting sleeve body 1. When the engaging member 21 engages with the engaging slot 201, a bottom surface of the storage tray 20 abuts against the upper end surface of the connecting sleeve body 1. Through the above structure, after the connecting sleeve body 1 is locked and fixed on the supporting rod 10, the storage tray 20 can be sleeved on the supporting rod 10, and after a direction of the engaging slot 201 is aligned with the engaging member 21, the engaging member 21 is capable of engaging with the engaging slot 201. A size of the engaging slot 201 basically matches a size of the engaging member 21, so that the storage tray 20 cannot rotate left and right under the restriction of the engaging member 21, thereby strengthening the stability of the storage tray. The design has a simple structure and convenient installation, and the user's needs and convenience are taken into account, thereby improving use experience.

In this embodiment, an inner wall of the connecting sleeve body 1 is fixedly connected with a first tightening rod 14 and a second tightening rod 15. The first tightening rod 14 and the second tightening rod 15 are respectively arranged on two opposite side walls of the connecting sleeve body 1. The first tightening rod 14 extends to an inner wall of the first clamping arm 311, and the second tightening rod 15 extends to an inner wall of the second clamping arm 312. Through the above structure, when the connecting sleeve body 1 is locked and fixed to the supporting rod 10, since a diameter of the supporting rod 10 is smaller than a inner diameter of the connecting sleeve body 1, the first tightening rod 14 and the second tightening rod 15 play a tightening role, making the connecting sleeve body 1 more firmly locked to the supporting rod 10, thereby enhancing a support force of the storage rack and improving stability.

In this embodiment, an outer surface of the fixing cap 321 is equipped with a plurality of anti-slip convex strips 322. Through the above structure, grip strength of the fixing cap 321 is improved, making it more convenient for the user to install or disassemble, and increasing safety and stability during use.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A connecting assembly of a storage rack comprising:
a connecting sleeve body, the connecting sleeve body being used for sleeving a supporting rod;
a position limiting device, the position limiting device being arranged on the connecting sleeve body, and the position limiting device being used for preventing a storage tray from rotating around the supporting rod in a circumferential direction; and
a locking device, the locking device being used for locking the connecting sleeve body onto the supporting rod;
wherein the locking device comprises a first connecting member and a second connecting member, the first connecting member is provided on the connecting sleeve body, and the first connecting member is connected to the second connecting member to lock the connecting sleeve body onto the supporting rod;
wherein the position limiting device comprises an engaging member fixedly connected to an upper end surface of the connecting sleeve body and longitudinally extending therefrom, and the engaging member is used for engaging with an engaging slot of the storage tray to limit circumferential rotation of the storage tray around the supporting rod;
wherein the engaging member is an approximately semi-circular arc-shaped sheet coaxial with a longitudinal axis of the connecting sleeve body, a thickness of the engaging member is less than a thickness of the connecting sleeve body, and when the engaging member engages with the engaging slot, a bottom surface of the storage tray abuts against the upper end surface of the connecting sleeve body.

2. The connecting assembly of the storage rack of claim 1, wherein the first connecting member and the second connecting member are detachably connected.

3. The connecting assembly of the storage rack of claim 1, wherein the connecting sleeve body is a U-shaped hollow sleeve body, and the connecting sleeve body is provided with a first side end, a second side end, and a first side opening; the first connecting member comprises a first clamping arm and a second clamping arm, the first clamping arm is connected to the first side end, and the second clamping arm is connected to the second side end; the second connecting member comprises a fixing cap, and the fixing cap is connected to the first clamping arm and the second clamping arm to cause the connecting sleeve body to converge radially inward and abut against the supporting rod.

4. The connecting assembly of the storage rack of claim 3, wherein an outer surface of the first clamping arm and an outer surface of the second clamping arm are both equipped with an external threaded structure, and the fixing cap is equipped with an internal threaded structure; the fixing cap engages with the first clamping arm and the second clamping arm through threads, and when the fixing cap is twisted into the first clamping arm and the second clamping arm, the first clamping arm and the second clamping arm drive the connecting sleeve body to converge radially inward and abut against the supporting rod.

5. The connecting assembly of the storage rack of claim 4, wherein the first clamping arm and the second clamping arm are arc-shaped.

6. The connecting assembly of the storage rack of claim 3, wherein an inner wall of the connecting sleeve body is fixedly connected with a first tightening rod and a second tightening rod, the first tightening rod and the second tightening rod are respectively arranged on two opposite side walls of the connecting sleeve body, the first tightening rod extends to an inner wall of the first clamping arm, and the second tightening rod extends to an inner wall of the second clamping arm.

7. The connecting assembly of the storage rack of claim 3, wherein an outer surface of the fixing cap is equipped with a plurality of anti-slip convex strips.

8. A storage rack comprising a supporting rod, a storage tray, and a connecting assembly, wherein the connecting assembly comprises:
a connecting sleeve body, the connecting sleeve body being used for sleeving the supporting rod;
a position limiting device, the position limiting device being arranged on the connecting sleeve body, and the position limiting device being used for preventing the storage tray from rotating around the supporting rod in a circumferential direction; and
a locking device, the locking device being used for locking the connecting sleeve body onto the supporting rod;
wherein the locking device comprises a first connecting member and a second connecting member, the first connecting member is provided on the connecting sleeve body, and the first connecting member is connected to the second connecting member to lock the connecting sleeve body onto the supporting rod;
wherein the position limiting device comprises an arc-shaped engaging member coaxial with a longitudinal axis of the connecting sleeve body, fixedly connected to an upper end surface of the connecting sleeve body and longitudinally extending therefrom, the storage tray is equipped with a through hole and an engaging slot, the through hole is in communication with the engaging slot, the storage tray is sleeved on the supporting rod through the through hole, and the engaging member engages with the engaging slot to limit circumferential rotation of the storage tray around the supporting rod.

9. The storage rack of claim 8, wherein the first connecting member and the second connecting member are detachably connected.

10. The storage rack of claim 9, wherein the connecting sleeve body is a U-shaped hollow sleeve body, and the connecting sleeve body is provided with a first side end, a second side end, and a first side opening; the first connecting member comprises a first clamping arm and a second clamping arm, the first clamping arm is connected to the first side end, and the second clamping arm is connected to the second side end; the second connecting member comprises a fixing cap, and the fixing cap is connected to the first clamping arm and the second clamping arm to cause the connecting sleeve body to converge radially inward and abut against the supporting rod.

11. The storage rack of claim 10, wherein an outer surface of the first clamping arm and an outer surface of the second clamping arm are both equipped with an external threaded structure, and the fixing cap is equipped with an internal threaded structure; the fixing cap engages with the first clamping arm and the second clamping arm through threads, and when the fixing cap is twisted into the first clamping arm and the second clamping arm relative to the connecting sleeve body, the first clamping arm and the second clamping arm drive the connecting sleeve body to converge radially inward and abut against the supporting rod.

12. The storage rack of claim 11, wherein the first clamping arm and the second clamping arm are arc-shaped.

13. The storage rack of claim 10, wherein an inner wall of the connecting sleeve body is fixedly connected with a first tightening rod and a second tightening rod, the first tightening rod and the second tightening rod are respectively arranged on two opposite side walls of the connecting sleeve body, the first tightening rod extends to an inner wall of the first clamping arm, and the second tightening rod extends to an inner wall of the second clamping arm.

14. The storage rack of claim 10, wherein an outer surface of the fixing cap is equipped with a plurality of anti-slip convex strips.

15. The storage rack of claim 8, wherein the engaging member is an approximately semicircular arc-shaped sheet, a thickness of the engaging member is less than a thickness of the connecting sleeve body, and when the engaging member engages with the engaging slot, a bottom surface of the storage tray abuts against the upper end surface of the connecting sleeve body.

\* \* \* \* \*